(12) United States Patent
Suzuki et al.

(10) Patent No.: US 8,863,967 B2
(45) Date of Patent: Oct. 21, 2014

(54) POURING PORT, METHOD FOR PRODUCING SAME AND CONTAINER FOR LIQUID PROVIDED WITH THE POURING PORT

(75) Inventors: Toyoaki Suzuki, Tokyo (JP); Koichi Miura, Tokyo (JP)

(73) Assignee: Fujimori Kogyo Co., Ltd., Tokyo (JP)

( * ) Notice: Subject to any disclaimer, the term of this patent is extended or adjusted under 35 U.S.C. 154(b) by 0 days.

(21) Appl. No.: 13/143,330

(22) PCT Filed: Dec. 24, 2009

(86) PCT No.: PCT/JP2009/071418
§ 371 (c)(1),
(2), (4) Date: Jul. 5, 2011

(87) PCT Pub. No.: WO2010/079693
PCT Pub. Date: Jul. 15, 2010

(65) Prior Publication Data
US 2011/0266184 A1 Nov. 3, 2011

(30) Foreign Application Priority Data
Jan. 6, 2009 (JP) ................................. 2009-001043

(51) Int. Cl.
*B65D 41/20* (2006.01)
*A61J 1/14* (2006.01)
*B32B 27/08* (2006.01)
*B32B 27/32* (2006.01)
*B29C 65/00* (2006.01)
*B29C 65/08* (2006.01)
*A61J 1/10* (2006.01)

(52) U.S. Cl.
CPC .............. *A61J 1/1475* (2013.01); *B29C 66/712* (2013.01); *B29C 65/08* (2013.01); *A61J 1/10* (2013.01); *B32B 27/08* (2013.01); *B32B 27/32* (2013.01); *B32B 2439/80* (2013.01)
USPC ........... 215/247; 215/232; 215/248; 215/249; 215/364; 206/524.1

(58) Field of Classification Search
CPC ............................. B29C 66/172; B29C 65/08
USPC ......... 215/247, 232, 248, 249, 364; 156/73.1; 150/8; 206/524.1
See application file for complete search history.

(56) References Cited

U.S. PATENT DOCUMENTS 4,108,947 A * 8/1978 Kimura et al. ............... 525/97
4,203,884 A * 5/1980 Coran et al. ............... 524/518
(Continued)

FOREIGN PATENT DOCUMENTS

JP          5-184642 A    7/1993
JP       2000-254208 A    9/2000
(Continued)

OTHER PUBLICATIONS

International Search Report dated Feb. 2, 2010 for PCT/JP2009/071418.
(Continued)

*Primary Examiner* — Andrew Perreault
*Assistant Examiner* — James M Van Buskirk
(74) *Attorney, Agent, or Firm* — Birch, Stewart, Kolasch & Birch, LLP

(57) ABSTRACT

A pouring port of a container for liquid at one end of which a rubber stopper allowing the penetration of an injection needle therethrough is embedded, wherein: the pouring port is formed by welding a port part, at least the innermost layer of which forming the discharge channel thereof comprises a resin containing a COP-based resin as the main component, with a stopper body part, which holds the rubber stopper and comprises a resin containing a COP-based resin as the main component, via the resin layers containing the respective COP-based resins as the main component; and at least the resin constituting the stopper body part contains a rubber component in an amount of not more than 30% by mass, or has, in the main chain, a molecular structure represented by general formula (1)

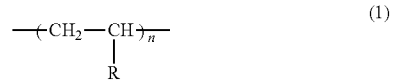

[wherein R represents a hydrogen atom or an organic group having 1 to 20 carbon atoms; and n represents an integer equal to or greater than 1]
and contains a PE-based resin in an amount of 30% by mass or less, and/or contains an antioxidant in an amount of 0.1% by mass or more and not more than 1.0% by mass.

7 Claims, 3 Drawing Sheets

(56) References Cited

U.S. PATENT DOCUMENTS

| | | | | |
|---|---|---|---|---|
| 4,219,912 | A * | 9/1980 | Adams | 604/86 |
| 4,254,884 | A * | 3/1981 | Maruyama | 215/232 |
| 4,916,185 | A * | 4/1990 | Yates et al. | 525/67 |
| 4,984,415 | A * | 1/1991 | Kuroda | 53/478 |
| 5,957,314 | A * | 9/1999 | Nishida et al. | 215/249 |
| 6,162,205 | A * | 12/2000 | Shichi et al. | 604/416 |
| 6,201,064 | B1 * | 3/2001 | Aoyama et al. | 525/63 |
| 6,310,112 | B1 * | 10/2001 | Vo et al. | 521/134 |
| 6,918,500 | B2 * | 7/2005 | Okiyama | 215/247 |
| 7,163,114 | B2 * | 1/2007 | Okiyama | 215/247 |
| 7,198,685 | B2 * | 4/2007 | Hetzler et al. | 156/69 |
| 7,776,414 | B2 * | 8/2010 | Iwasaki et al. | 428/35.4 |
| 2005/0031812 | A1 * | 2/2005 | Suzuki | 428/35.2 |
| 2008/0044606 | A1 * | 2/2008 | Omori et al. | 428/35.9 |
| 2008/0255521 | A1 * | 10/2008 | Kubo et al. | 604/191 |
| 2010/0012255 | A1 * | 1/2010 | Sekihara et al. | 156/73.1 |

FOREIGN PATENT DOCUMENTS

| | | |
|---|---|---|
| JP | 2001-187815 A | 7/2001 |
| JP | 2001-278320 A | 10/2001 |
| JP | 3227709 B2 | 11/2001 |
| JP | 2004-298220 A | 10/2004 |
| JP | 2005-254508 A | 9/2005 |
| JP | 2007-9114 A | 1/2007 |
| JP | 2008-18063 A | 1/2008 |
| WO | WO 02/45648 A1 | 6/2002 |

OTHER PUBLICATIONS

Office Action dated Jun. 16, 2010, issued in counterpart Japanese Patent Application No. JP-2010-511415.

\* cited by examiner

POURING PORT, METHOD FOR PRODUCING SAME AND CONTAINER FOR LIQUID PROVIDED WITH THE POURING PORT

TECHNICAL FIELD

This invention relates to an outlet port, a method for forming the same, and a fluid container provided with the outlet port. More specifically, the present invention is concerned with an outlet port resistant to the occurrence of crazes, fine particles or dusting when the outlet port is formed by welding a port portion, which is formed of a resin composed of a cyclic polyolefin resin as a principal component, and a plug portion for holding a rubber plug, which is formed of a resin composed of a cyclic polyolefin resin as a principal component, with each other, or the occurrence of a fracture from the plug portion of the outlet port upon dropping of a container a method for forming the same, and a fluid container provided with the outlet port.

BACKGROUND ART

In recent years, there have been developed soft bag preparations obtained by diluting injectable drugs into intravenous drip preparations beforehand and filling them in containers having flexibility such as plastic-made containers. These soft bag preparations are considered to be useful for their superior disposability to glass-made bottles and ampoules in addition to their convenience and readiness at the time of use.

However, drugs led by nitroglycerin, preparations containing proteins such as albumin and hormones, hyaluronic acid drugs, vitamins, trace elements, insulin, anticancer drugs, antibody drugs, radical scavenger drugs and the like are known that their active ingredients adsorb on or permeate through the base materials of medicine containers, such as conventional polyolefin-based resins (PO resins), e.g., polyethylene (PE) and polypropylene (PP), and polyvinyl chloride, and therefore involve such problems that the active ingredients in content fluids may decrease and interactions may occur between additives or low-molecular components contained in the base materials and the active ingredients in the content fluids.

In regard to these problems, it has been proposed, for example, in Japanese Patent No. 3227709 (Patent Document 1) and JP-A 2004-298220 (Patent Document 2) to use cyclic polyolefin resins (COP resins) in container main bodies as resins that are free of adsorption or permeation of active ingredients.

In JP-A 2008-18063 (Patent Document 3) and JP-A 2005-254508 (Patent Document 4), packaging bags formed of laminated films having COP resins in innermost layers thereof are disclosed.

These packaging bags are described to allow retort sterilization treatment and to inhibit the adsorption of ingredients, and hence, to be suited for use with injectable preparations the active ingredients of which are prone to adsorption.

In the above-cited Patent Document 3, it is also described to the effect that the innermost layer of a container film may be formed of COP resin and a port formed of COP resin may also be used as an outlet port. As methods for welding together a port portion and a plug portion that serves to hold a rubber plug in place, heat sealing and ultrasonic welding are also described. However, no indication is made at all about the problematic occurrence of crazes upon ultrasonic welding. Moreover, no consideration is made either for the prevention of the occurrence of cracks when a container with a content fluid filled therein is accidentally dropped.

The above-cited Patent Document 4 also contains a description of a medical container which uses COP resin in its innermost layer. It is also described that, from the viewpoint of imparting flexibility to an outlet port to make an improvement in the sealing performance with a sheet, a thermoplastic elastomer may be blended at a blend ratio of not greater than 20%. In other words, it is disclosed to blend a thermoplastic elastomer in a port portion of the outlet port, said port portion being the part where the outlet port is welded with a sealant of the container. However, absolutely no detailed disclosure is made about a plug portion that serves to hold a rubber plug in place. It is disclosed that, if the thermoplastic elastomer in the port portion exceeds 20%, there is a greater potential problem of adsorption of the ingredient of a content fluid on the port portion or the container may be provided with inferior retort sterilizability.

Now assume that a port portion, which makes up an outlet port, and a plug portion, which serves to hold a rubber plug in place, are both formed of COP resin. Compared with low-density polyethylene or the like, COP resin has a greater molecular weight, is more linear, and owing to cyclic hydrocarbon groups, has a bulky molecular structure in its molecular skeleton. Therefore, the thermal motion of its molecular backbone is restricted, and parts, which are both formed of COP resin can hardly be welded together by conventional heat sealing. In contrast, these parts can be welded together by ultrasonic welding as COP resin is hard. Ultrasonic welding of COP resin can be achieved in a short time, and is effective and preferable as a welding method. However, COP resin is brittle so that compared with other resins, a COP resin layer is more prone to occur crazes or dusting by ultrasonic waves. There is, accordingly, a potential problem that a fluid leak may take place through the crazes or foreign matter may enter a content fluid as a result of dusting.

A container, for example, with an infusion fluid filled therein is generally hung to perform its administration by drip infusion. There is, however, a potential problem that upon hanging the container, it may be accidentally dropped. In the event of dropping, there is high possibility that a plug portion of an outlet port, said plug portion being arranged at a position opposite to a hanging hole, may first come into contact against the floor. Moreover, COP resin is hard and brittle, and therefore, is prone to fracture. Accordingly, there is a long-standing desire for the development of a medical fluid container provided with an outlet port that is free of adsorption or permeation of an active ingredient, can prevent the occurrence of crazes or dusting upon welding of the outlet port, and is resistant to fracture even when an impact is applied as a result of dropping or the like.

PRIOR-ART DOCUMENTS

Patent Documents

Patent Document 1: Japanese Patent No. 3227709
Patent Document 2: JP-A 2004-298220
Patent Document 3: JP-A 2008-18063
Patent Document 4: JP-A 2005-254508

SUMMARY OF THE INVENTION

Problems to be Solved by the Invention

With the foregoing circumstances in view, the present invention has as objects thereof the provision of an outlet port resistant to the occurrence of crazes, fine particles or dusting upon formation of the outlet port by welding a port portion, which is formed of a resin composed of a COP resin as a principal component, and a plug portion for holding a rubber plug in place, which is formed of a resin composed of a COP resin as a principal component, with each other or resistant to the occurrence of a fracture from the plug portion of the outlet port upon dropping of a container, a method for forming the same, and a fluid container provided with the outlet port.

Means for Solving the Problems

To achieve the above-described objects, the present inventors enthusiastically performed research. As a result, it has been found that the above-described problem can be solved by contriving the resin of the plug portion of the outlet port, leading to the completion of the present invention.

Described specifically, the present invention provides the following outlet ports, forming methods of the same, and fluid container provided with one of the outlet ports.

Claim 1:
An outlet port for a fluid container, said outlet port being capable of accommodating a rubber plug, through which a syringe needle can be inserted, such that the rubber plug is buried in an end of the outlet port, wherein the outlet port includes a port portion and a plug portion, at least an innermost layer of the port portion, said innermost layer defining a delivery channel of the outlet port, is formed of a resin composed of a cyclic polyolefin resin as a principal component, the plug portion can serve to hold the rubber plug in place and is formed of a resin composed of a cyclic polyolefin resin as a principal component, the port portion and plug portion are welded together at their resin layers composed of the cyclic polyolefin resins as the principal components, respectively, and at least the resin that forms the plug portion includes a rubber component in a range of not greater than 30 wt %, or includes in a backbone thereof molecular structures represented by the following formula (1) and includes a polyethylene-based resin in a range of not greater than 30 wt % and/or an antioxidant in a range of from 0.1 wt % to 1.0 wt %:

[Chemical Formula 1]

(1)

wherein R represents a hydrogen atom or an organic group having from 1 to 20 carbon atoms, and n stands for an integer of 1 or greater.

Claim 2:
The outlet port according to claim 1, wherein the resin that forms the port portion includes a rubber component in a range of not greater than 20 wt %, or includes in a backbone thereof molecular structures represented by the formula (1) and includes a polyethylene-based resin in a range of not greater than 20 wt %.

Claim 3:
The outlet port according to claim 1 or 2, wherein the rubber component is a thermoplastic elastomer.

Claim 4:
The outlet port according to any one of claims 1 to 3, wherein the port portion has, at a part thereof where the port portion is welded with the plug portion, a flange portion provided with a resin layer, which is composed of a cyclic polyolefin-based resin as a principal component, and extending out from the port portion.

Claim 5:
A method for forming an outlet port according to any one of claims 1 to 4, which includes ultrasonically welding the resin layer of the port portion, said resin layer being composed of the cyclic polyolefin-based resin as the principal component, and the resin layer of the plug portion, said resin layer being composed of the cyclic polyolefin-based resin as the principal component, with each other.

Claim 6:
The method according to claim 5, wherein the ultrasonic welding is performed while supporting the flange portion of the port portion on an anvil and maintaining the plug portion in contact with a horn.

Claim 7:
A fluid container including a container main body formed of a multi-layer film with a sealant of a resin, which is composed of a cyclic olefin resin as a principal component and is laminated on a side of the multi-layer film, and at least one outlet port according to any one of claims 1 to 6 welded to a part of the container main body.

Advantageous Effect of the Invention

According to the present invention, there can be provided an outlet port resistant to the occurrence of crazes, fine particles or dusting upon formation of the outlet port by welding a port portion, which is formed of a resin composed of a COP resin as a principal component, and a plug portion, which is formed of a resin composed of a COP resin as a principal component and serves to hold a rubber plug in place, with each other or resistant to the occurrence of a fracture from the plug portion of the outlet port upon dropping of a container, a method for forming the same, and a fluid container provided with the outlet port.

In detail, the following advantageous effects can be brought about.

According to the invention as described in claim 1, it is possible to prevent the adsorption or permeation of an active ingredient on or through the resin that makes up the outlet port. It is also possible to prevent the occurrence of crazes, fine particles or dusting when the port portion, which is formed of the resin composed of the COP resin as the principal component, and the plug portion, which is formed of the resin composed of the COP resin as the principal component, are ultrasonically welded with each other upon formation of the outlet port, or the occurrence of a bag rupture from the plug portion of the outlet port upon dropping of the container.

According to the invention as described in claim 2, the advantageous effects of the invention as described in claim 1 become more pronounced, and in addition, the occurrence of a fracture at the port portion of the outlet port upon dropping of the container can also be prevented more effectively.

According to the invention as described in claim 3, it is possible, in addition to the advantageous effects of the invention as described in claim 1 or 2, to more effectively prevent the occurrence of a fracture at the port portion of the outlet port upon dropping of the container.

According to the invention as described in claim 4, it is possible, in addition to the advantageous effects of the invention as described in any one of claims 1 to 3, to use the flange portion as a part to be welded with the plug portion, thereby facilitating the welding work of the COP resin layers themselves although their welding work has heretofore been difficult. As a result, it is possible to more effectively prevent the occurrence of a fracture at the port portion of the outlet port upon dropping of the container.

According to the invention as described in claim 5, the welding work of the COP resin layers themselves by ultrasonic waves can be easily facilitated although their welding work has been difficult. As a result, it is possible to more effectively prevent the occurrence of a fracture at the port portion of the outlet port upon dropping of the container.

According to the invention as described in claim 6, it is possible, in addition to the advantageous effects of the invention as described in claim 5, to more surely perform the welding work of the COP resin layers themselves. As a result, it is possible to more effectively prevent the occurrence of a fracture at the port portion of the outlet port upon dropping of the container.

According to the invention as described in claim 7, it is possible to obtain a fluid container, which can prevent the occurrence of adsorption or permeation of an active ingredient of a content fluid not only on or through the container main body but also on or through the resin that makes up an outlet port and can also prevent the occurrence of crazes or dusting which would occur upon welding the port portion and plug portion of the outlet port with each other, or the occurrence of a bag rupture from the plug portion of the outlet port upon dropping of the container.

EMBODIMENT FOR CARRYING OUT THE INVENTION

The present invention will hereinafter be described in more detail with reference to the drawings.

Figure 1:
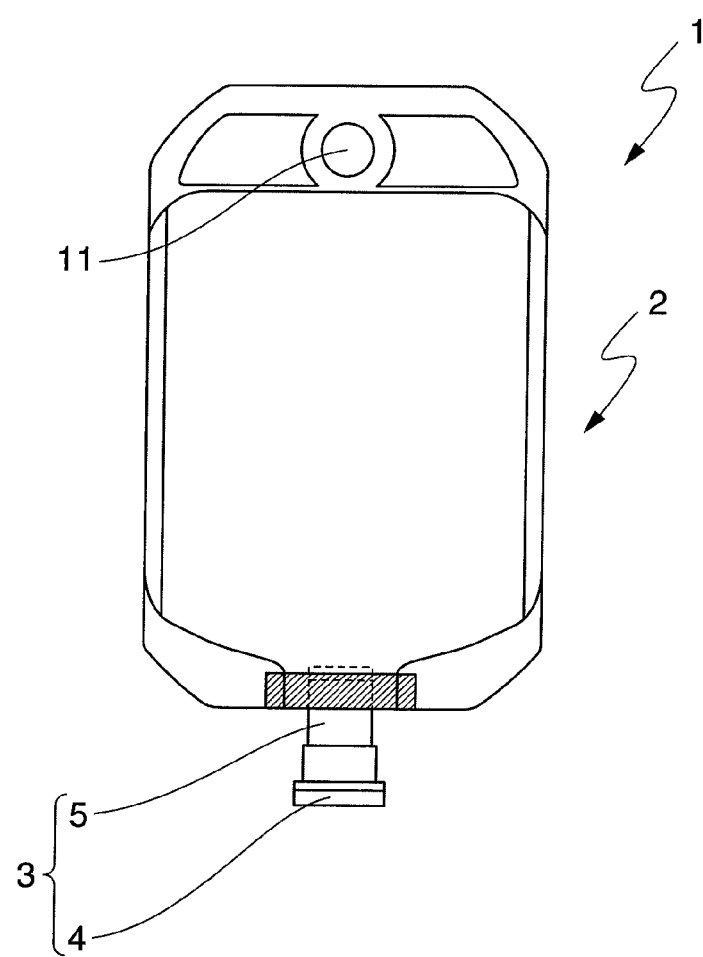
FIG. 1 is a plan view illustrating one embodiment of a fluid container according to the present invention.

FIG. 1 is a plan view illustrating an embodiment of the fluid container according to the present invention.

A fluid container 1 according to the present invention includes a container main body 2 and at least one outlet port 3 welded to the container main body 2. The container main body 2 has been formed in the form of a bag by welding a multi-layer film or tube, which has a sealant of a resin composed of a COP resin as a principal component (which may hereinafter be called "COP sealant") laminated on one side thereof, along their peripheries, or has been blow-molded. The outlet port 3 is composed of a plug portion 4 and a cylindrical hollow port portion 5 arranged in continuation with the plug portion 4. The plug portion 4 holds a rubber plug 6 in place by covering a part of the rubber plug 6 with a resin covering 7. The cylindrical hollow port portion 5 defines a delivery channel 9.

It is to be noted that in the present invention, "a film" and "a sheet" are each called "a film" without distinguishing them. Further, the films which make up the container main body 2 formed of the multi-layer film or tube or the blow-molded container main body 2, respectively, are collectively called "multi-layer films." In addition, the term "principal component" means a component that is contained as much as 50 wt % or more.

As the fluid container 1 is used primarily to store a medical fluid, the container main body 2 may preferably remain free of deformations or a bag rupture when subjected to retort sterilization at 105° C. or higher, preferably 110° C. or higher, more preferably 115° C. or higher. Each COP resin in the present invention may be either a single type of COP resin or a blend of plural types of COP resins, but its glass transition temperature may be preferably 100° C. or higher, more preferably 110° C. or higher whichever the case may be. The film that makes up the container main body 2 may preferably be transparent, as the transparent film is excellent in the visibility of a content fluid and facilitates the checking of the content fluid for any alteration or the like.

As a method for forming the container main body 2 of the fluid container 1, a known method can be adopted. The COP sealant can be laminated on one side, for example, by multi-layer inflation molding, co-extrusion molding such as multi-layer T-die casting molding, multi-layer blow molding, or a lamination method such as extrusion lamination that directly laminates a molten resin or dry lamination that uses an adhesive.

The container main body 2 of the fluid container 1 is formed of a transparent film made of the COP sealant and another resin layer laminated together. As another resin layer, a PO resin such as PE or PP is preferably used. Examples of the PO resin include conventionally-known high-density polyethylene (HDPE), linear low-density polyethylene (LL-DPE), medium-density polyethylene (MDPE), polypropylene (PP), ethylene-propylene copolymer and elastomers thereof, and blends of these resins. The lamination of such a PO resin makes it possible to provide the container main body with both heat resistance and flexibility.

When laminating a COP resin and a PO resin by co-extrusion molding, they may be directly laminated one over the other. As an alternative, however, an adhesive resin represented by "ADMER" (product of Mitsui Chemicals, Inc.), "MODIC" (product of Mitsubishi Chemical Corporation) or the like can also be used.

In place of the PO resin layer or as a further resin to be laminated along with the PO resin layer, it is possible to laminate a base material film for ensuring physical strength or a layer for imparting oxygen and moisture barrier properties.

As the base material film for ensuring physical strength, a polyethylene terephthalate (PET) or nylon film or the like can be used. When stretched, the base material film is preferably provided with higher physical strength. Biaxial stretching is more preferred.

As the layer that imparts barrier properties such as an oxygen barrier property and a moisture barrier property, it is possible to use a resin layer such as ethylene-vinyl alcohol copolymer, polyvinyl alcohol or a coating film thereof, MXD nylon, polyvinylidene chloride or a coating film thereof, a fluorinated resin-based film, or a PET, nylon or like film with alumina or silica vapor-deposited thereon.

When the fluid container is a blow-molded container, multi-layer extrusion blow molding may be suitably adopted, for example. As a multi-layer extrusion blow molding method, a multi-layer extruder having plural extruders is used, the COP resin and PO resin and, if necessary, an adhesive resin and other synthetic resin or resins are molten and extruded in and through the respective extruders, and air is blown in to perform blow molding. Upon performing the blow molding, the resins may once be formed into a preform, followed by blow molding, or direct blow molding may be performed, that is, layers of the respective molten resins may be formed into a tubular multi-layer parison inside multi-layer parison-forming dies, followed by blow molding.

The fluid container 1 is provided at a part of the container main body 2 with at least one outlet port 3. For the administration of the content fluid by drip infusion or a like purpose, it is convenient for the fluid container 1 to arrange at a position opposite to the outlet port 3 a hanging section (not shown) formed of the hole 11 which enables to hang the fluid container 1, a slit which has been formed by cutting the container main body 2 at a part thereof, or the like. The outlet port 3 can also serve as a filling port or the like, and a plurality of such outlet ports may be arranged.

A description will now be made about a method for welding the outlet port 3 and the container main body 2 with each other. When the container main body 2 is a bag-shaped container, multi-layer films are superpositioned one over the other with their sealants being brought into a contiguous relation, and with the port portion 5 of the outlet port 3 being inserted between the sealants, the multi-layer films can then be welded with each other by heat sealing or ultrasonic sealing.

When the container main body 2 is a blow-molded product, on the other hand, the port portion 5 can be welded to the container main body 2 by performing insert molding with the port portion 5 being inserted in a mold upon molding of the container main body 2. As an alternative, the container main body 2 is molded with an opening, the port portion 5 is subsequently inserted in the opening, and the port portion 5 can then be welded to the container main body 2 by heat sealing or ultrasonic sealing.

Figure 2:
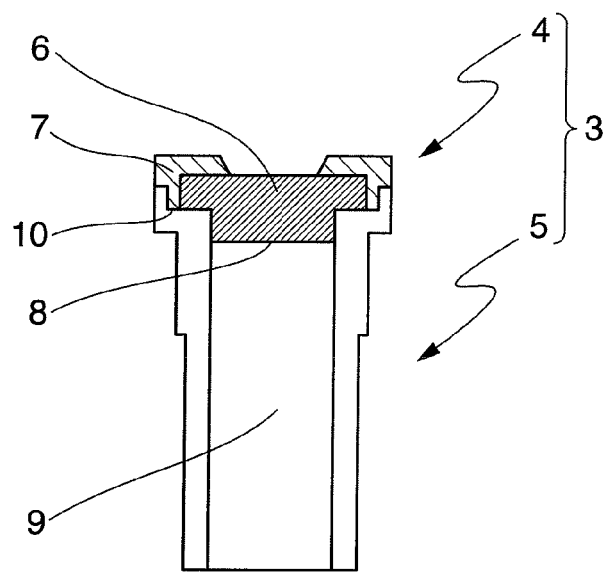
FIG. 2 is a cross-sectional view illustrating an embodiment of the outlet port according to the present invention.

FIG. 2 is a cross-sectional view illustrating a embodiment of the outlet port 3 according to the present invention.

Figure 3:
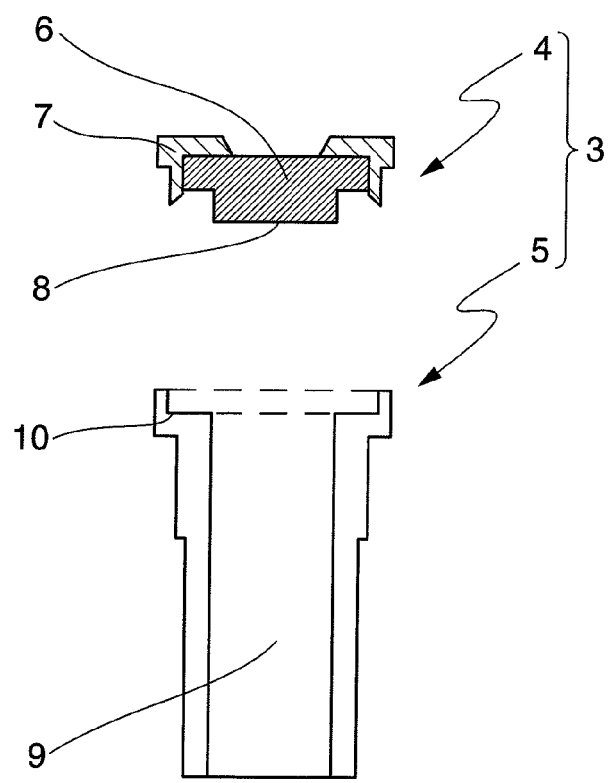
FIG. 3 is a cross-sectional view illustrating a plug portion (fitting type) and a port portion in the embodiment of the outlet port according to the present invention.
Figure 4:
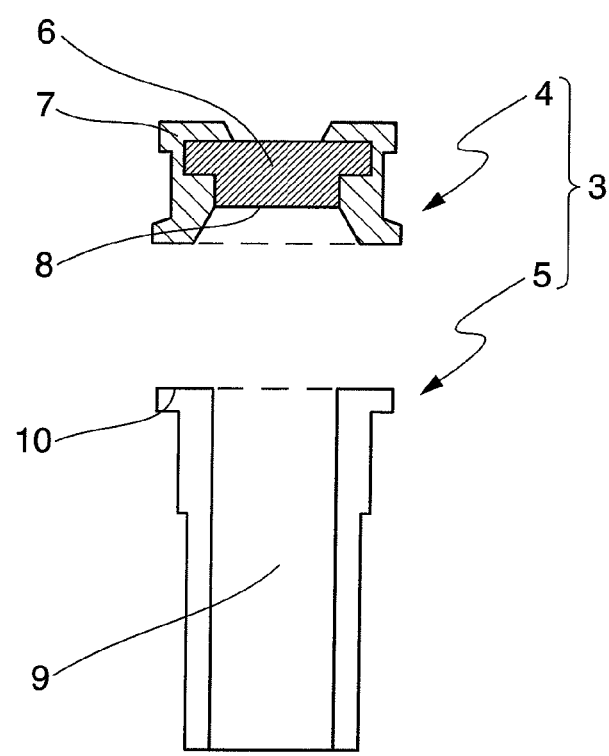
FIG. 4 is a cross-sectional view illustrating a plug portion (insert molding type) and a port portion in another embodiment of the outlet port according to the present invention.

FIG. 3 is a concept diagram illustrating that the port portion 5 and the plug portion 4 are fitted and welded together. Further, FIG. 4 is a cross-sectional view illustrating another embodiment of the outlet port 3 according to the present invention.

The outlet port 3 according to the present invention is formed by welding a part of the plug portion 4 with a flange portion 10 of the port portion 5. The plug portion 4 holds the rubber plug 6 in place by covering a part of the rubber plug 6 with the resin covering 7. The rubber plug 6 is held in place by physically fitting the rubber plug 6 in the resin covering 7 or performing insert molding with the rubber plug 6 being inserted in a mold upon molding the resin covering 7.

To prevent the adsorption or permeation of the active ingredient of the content fluid, the port portion 5 of the outlet port 3 is formed, at an innermost layer thereof to which the content fluid in the delivery channel 9 is brought into contact, with a resin composed of a COP resin as a principal component. The plug portion 4 of the outlet port 3 is also formed with a resin, which is composed of a COP resin as a principal component, to prevent the adsorption or permeation of the active ingredient of the content fluid.

As a method for welding the flange portion 10 of the port portion 5 with the part of the plug portion 4, the welding method that makes use of heat generated by ultrasonic waves is common. The ultrasonic welding method is suited for welding together resins both composed of hard COP resins as principal components, and requires a short welding time.

As another welding method, the flange portion 10 of the port portion 5 and the part of the plug portion 4 can also be welded with each other by bringing both the flange portion 10 and the part close to a heating element and then heating them for a predetermined time under non-contact conditions to melt them. As such a heating element, a conventionally-known heating element can be used. Such a heating element may preferably be a nickel-based alloy of International Nickel Company.

In general, COP resin has a small breaking elongation of from 3 to 60% and is as hard as from 2,000 to 3,200 MPa in flexural modulus, so that COP resin cannot cushion an impact from the outside and is brittle. On the other hand, PE resin employed in conventional container main bodies sufficiently elongates as much as from 700 to 1,000% in breaking elongation and is flexible as much as from 100 to 700 MPa in flexural modulus. Compared with a plug portion made of PE resin, an outlet port made of COP resin involves such problems that crazes may be formed at the outlet port or dusting may become substantial when ultrasonic welding is performed or the fluid container with a content fluid filled therein is accidentally dropped. The crazes so formed may not be visually confirmed in many instances and, when the content fluid is filled in the fluid container, the crazes may grow under vibrations by transportation and the like and may induce a fluid leak. In particular, a plug portion made of COP resin is prone to crazing, because upon ultrasonic welding, a horn comes into direct contact with the plug portion to vibrate it.

When the COP resin is a COP resin including molecular structures represented by the above-described formula (1) in its backbone, the COP resin is still harder in comparison with a COP resin which does not include such molecular structures in its backbone. In general, oxidative degradation proceeds at the surface of a molded product in the course of its molding. When a hard COP resin is subjected to oxidative degradation, the surface of its molded product tends to become brittle as a result of the oxidative degradation. The hard COP resin which has been subjected to the oxidative degradation is accompanied by a problem in that under vibrations produced by ultrasonic welding of the port portion and plug portion, the surface subjected to the oxidative degradation may partially chip off to produce more fine particles.

To overcome this problem, an antioxidant may preferably be added more than usual in the present invention to decrease fine particles to be produced upon ultrasonic welding when the COP resin is a COP resin including molecular structures represented by the above-described formula (1) in its backbone.

To prevent the occurrence of such crazes and the occurrence of such fine particles or dusting, the present invention incorporates, in at least the resin covering 7 of the plug portion 4 out of the port portion 5 formed of the resin composed of the COP resin as the principal component (which may hereinafter be called "the COP port portion") and the resin covering 7 of the plug portion 4 formed of the COP resin as the principal component (which may hereinafter be called "the COP resin covering") a rubber component in a range of from 0.05 wt % to 30 wt %, both inclusive, preferably from 0.1 wt % to 10 wt %, both inclusive, more preferably from 0.3 wt % to 5 wt %, both inclusive; or includes in its backbone molecular structures represented by the above-described formula (1) and contains a PE resin in a range of from 1 wt % to 30 wt %, both inclusive, preferably from 3 wt % to 20 wt %, both inclusive, more preferably from 5 wt % to 10 wt %, both inclusive, and/or an antioxidant in a range of from 0.1 wt % to 1.0 wt %, both inclusive, preferably from 0.2 wt % to 0.6 wt %, both inclusive, more preferably from 0.3 wt % to 0.5 wt %, both inclusive.

If the rubber component or PE resin falls below the above-described range, the effects of preventing dusting, the occurrence of crazes and a fracture from the plug portion of the outlet port may not be exhibited sufficiently. If the rubber component or PE resin exceeds the above-described range, on the other hand, the performance to prevent dusting, the occurrence of crazes and the fracture from the plug portion of the outlet port can be improved, but the resin covering 7 may become excessively soft and may be provided with reduced heat resistance so that the resin covering 7 may become unable to retain its shape at the time of retort sterilization treatment. If the antioxidant falls below the above-described range, the effect of preventing the occurrence of fine particles upon ultrasonic welding of the port portion and the plug portion may not be exhibited sufficiently. If the antioxidant exceeds the above-described range, on the other hand, the occurrence of fine particles can still be prevented but such an excessive incorporation of the antioxidant exceeds an appropriate amount of its use and is not preferred from the standpoint of cost.

It is generally a known technology to use an antioxidant for the purpose of preventing oxidative degradation of a resin. In such a case, however, the antioxidant is used in a range of from 0.03 wt % to 0.08 wt % or so because there is a potential problem that gel-like matter may be produced upon molding or the antioxidant may bleed out to the surface of a molded product with time.

In the present invention, the contents of the rubber component, PE resin and antioxidant in the resin covering 7 of the plug portion 4 can be set high, because the rubber plug 6 blocks a content fluid to prevent it from coming into contact with the resin covering 7 and the resin covering 7 does not affect an active ingredient of the content fluid. Also in the embodiment illustrated in FIG. 4, a content fluid comes into contact with the resin covering 7 at only a small part thereof, so that the resin covering 7 does not affect much an active ingredient of the content fluid.

In the present invention, the resin of the COP port portion 5 can also be either a COP resin which does not include in its backbone molecular structures represented by the above-described formula (1) or a COP resin which contains neither a rubber component nor PE resin. To enhance the preventing effects on the occurrence of crazes or dusting upon ultrasonic welding or to prevent a fracture of the port portion 5 upon dropping, the resin of the COP port portion 5 may preferably contain a rubber component in a range of from 0.05 wt % to 20 wt %, both inclusive, preferably from 0.1 wt % to 10 wt %, both inclusive, more preferably from 0.3 wt % to 5 wt %, both inclusive, or may preferably include in its backbone molecular structures represented by the formula (1) and may preferably contain a PE resin in a range of from 0.5 wt % to 20 wt %, both inclusive, preferably from 1 wt % to 10 wt %, both inclusive. Even when an antioxidant is incorporated in a greater amount, the COP resin that includes in its backbone the molecular structures represented by the formula (1) does not produce gel-like matter at the time of molding or does not allow an antioxidant to bleed out to the surface of a molded product with time. It is, therefore, preferred to also contain the antioxidant in a range of from 0.03 wt % to 0.5 wt %, both inclusive, preferably from 0.03 wt % to 0.3 wt %, both inclusive, for enhancing the preventive effects on the occurrence of fine particles upon ultrasonic welding.

No particular limitation is imposed on the method of incorporation of the rubber component or antioxidant or on the method of introduction of the molecular structures represented by the formula (1). In addition to dry blending, melt blending or the like, they may be introduced in the course of polymerizing the COP resin by reactor polymerization or multi-step polymerization or they may be mixed after the polymerization of the COP resin.

Examples of the rubber component usable in the present invention include high molecular compounds or the like such as rubbery polymers having glass transition temperatures of not higher than 20° C., such as styrene- or butadiene-based, random or block copolymers such as styrene-butadiene rubber and high-styrene rubber, and their hydrogenation products; isoprene rubber and its hydrogenation product; chloroprene rubber and its hydrogenation product; saturated polyolefin rubbers such as ethylene-propylene copolymer, ethylene-α-olefin copolymers, and propylene-α-olefin copolymers; diene-based polymers such as ethylene-propylene-diene copolymers, α-olefin-diene copolymers, diene copolymers, isobutylene-isoprene copolymer and isobutylene-diene copolymers, their halogenated products, and hydrogenated products of the diene polymers and their halogenated products; acrylonitrile-butadiene copolymer and its hydrogenation product; fluorinated rubbers such as vinylidene fluoride-trifluoroethylene copolymer, vinylidene fluoride-hexafluropropylene copolymer, vinylidene fluoride-hexafluoropropylene-tetrafluoroethylene copolymer and propylene-tetrafluoroethylene copolymer; specialty rubbers such as urethane rubbers, silicone rubbers, polyether-based rubber, acrylic rubbers, chlorosulfonated polyethylene rubber, epichlorohydrin rubber, propylene oxide rubber, and ethylene-acrylic rubber; norbornene-based rubbery polymers, such as norbornene monomer-ethylene or α-olefin copolymers, norbornene monomer-ethylene-α-olefin terpolymers, ring-opening polymerization products of norbornene monomers and hydrogenation products of ring-opening polymerization products of norbornene monomers, except for those compatible with thermoplastic norbornene-based resins as principal components of resin compositions; aromatic vinyl monomer-conjugated diene random copolymers such as styrene-butadiene-styrene rubber, styrene-isoprene-styrene rubber and styrene-ethylene-butadiene-styrene rubber, and their hydrogenation products; thermoplastic elastomers led by styrene-based thermoplastic elastomers such as linear or radial, block copolymers of aromatic vinyl monomers and conjugated diene, e.g., styrene-butadiene-styrene rubber, styrene-isoprene-styrene rubber and styrene-ethylene-butadiene-styrene rubber, and their hydrogenation products, and including urethane-based thermoplastic elastomers, polyamide-based thermoplastic elastomers, 1,2-polybutadiene-based thermoplastic elastomers, vinyl chloride-based thermoplastic elastomers and fluorinated thermoplastic elastomers; poly(meth) acrylate resins having cyclic substituent groups such as cyclohexyl groups, isobornyl groups, tricyclo[4.3.0.12.5]decan-3-yl groups or tricyclo[4.3.0.12.5]-7-decen-3-yl groups; polyamide resins such as copolymers of styrenes and (meth) acrylates such as octyl acrylate, hexyl acrylate and butyl acrylate, and poly(aminocarbonyltetramethylenecarbonylaminomethylene-1,3-cyclohexylenemethylene); polyester resins such as poly[oxycarbonyl(1,3-phenylene) carbonyloxymethylene-(tricyclo[4.3.0.12.5]-3,8-diyl)methylene]; polyether resins such as polybutylene oxide and poly [oxy(2-methyl-2-hydroxy-trimethylen)oxy(1,4-phenylene) isopropylidene(1,4-phenylene)]; polycarbonate resins such as poly[oxycarbonyloxy(2-methyl-1,4-cyclohexylene)isopropylidene(3-methyl-1,4-cyclohexylene)]; and polyurethane resins.

Among these, thermoplastic elastomers are particularly suited as no much matter is dissolved out from them. Especially, thermoplastic elastomers such as styrene-butadiene block copolymer, styrene-butadiene-styrene block copolymer, styrene-isoprene block copolymer and styrene-isoprene-styrene block copolymer, their hydrogenation products, and styrene-butadiene random copolymer are preferred for their good dispersibility.

As the antioxidant for use in the present invention, conventionally-known antioxidants such as phenol-based antioxidants, phosphorus-containing antioxidants, sulfur-containing antioxidants, vitamin E and hindered amine-based light stabilizers can be used either singly or in combination.

No particular limitation is imposed on the COP resins for use in the present invention insofar as they are cyclic polyolefins. Illustrative are polymers of various cyclic olefin monomers, copolymers of cyclic olefin monomers and other monomers such as ethylene and their hydrogenation products, and the like.

Examples of the monomers of the COP resins for use in the present invention include bicyclic olefins such as norbornene, norbornadiene, methylnorbornene, dimethylnorbornene, ethylnorbornene, chlorinated norbornene, chloromethylnorbornene, trimethylsilylnorbornene, phenylnorbornene, cyanonorbornene, dicyanonorbornene, methoxycarbonylnorbornene, pyridylnorbornene, nadic anhydride, and nadic acid imide; tricyclic olefins such as dicyclopentadiene and dihydrodicyclopentadiene, and their alkyl, alkenyl, alkylidene and aryl substitutes; tetracyclic olefins such as dimethanohexahydronaphthalene and dimethanooctahydronaphthalene, and their alkyl, alkenyl, alkylidene and aryl substituents; pentacyclic olefins such as tricyclopentadiene; hexacyclic olefins such as hexacycloheptadecene; and the like. Also included are compounds containing the norbornene ring, such as dinorbornene and compounds obtained by coupling two norbornene rings via hydrocarbon chains, ester groups or the like, their alkyl and aryl substituents, and the like.

Among these, preferred are polynorbornene-based resins obtained by polymerizing one or more of norbornene-based monomers containing the norbornene skeleton in their molecular skeletons, such as dicyclopentadiene, norbornene and tetracyclododecene; their hydrogenation products; blends of two or more of these polynorbornene-based resins and their hydrogenation products; and the like.

The polymerization method or polymerization mechanism of each COP resin in the present invention can be either ring-opening polymerization or addition polymerization. As the polymerization method and the structure of the resulting polymer when plural monomers are used in combination, they can be formed into a known polymer by using a known method. For example, plural monomers can be combined together while they are monomers, and copolymerization may then be performed. As an alternative, after being polymerized to some extent, the monomers may then be combined together into a block copolymer. Several of such polymers and block polymers may be blended and used.

No particular limitation is imposed on the rubber plug 6 to be held in place and buried in the plug portion 4 of the outlet port 3 according to the present invention, insofar as it is one that is in common use. It is, therefore, possible to use a conventionally-known rubber plug. Examples include plugs made of rubbers such as butyl rubber, isoprene rubber, chlorinated butyl rubber and silicone rubbers; and laminated rubber plugs similar to such rubber-made plugs except that fluorinated resins, ultrahigh molecular weight polyethylene, high molecular weight polyethylene, LLDPE, polypropylene-based resins or the like are bonded as protective layers on surfaces with which content fluids come into contact. Of these, the laminated rubber plugs are preferred because, when the needles of syringes or the like are inserted through the rubber plugs 6, the laminated rubber plugs can prevent such a problem that the rubbers may be chipped off and mixed in the content fluids, active ingredients of the content fluids may be adsorbed on the rubber plugs, or the rubber plugs may undergo interaction with the content fluids. The rubber plug may also be produced using an elastomer resin in place of a rubber. The use of such an elastomer resin is preferred, because the active ingredient of the content fluid is not adsorbed much even if the protective layer is omitted.

EXAMPLES

The present invention will hereinafter be described specifically based on Examples and Comparative Examples. It should, however, be borne in mind that the present invention is not limited to the following Examples.

Example 1

Production of Fluid Container 1

40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a sealant such that it was provided with 115° C. glass transition temperature. A reactor-polymerized, propylene-ethylene based elastomer of 900 $kg/m^3$ density, a modified polyolefin-based adhesive resin ("MC719," product of Mitsubishi Chemical Corporation), and the sealant were formed into films of 170 μm, 30 μm and 50 μm thickness, respectively, by the water-cooled, multi-layer inflation method to prepare a multi-layer film of 250 μm in total thickness.

With a port portion 5 of an outlet port 3, which had been formed as will be described below, being held between two pieces of the multi-layer film such that the innermost layer of a fluid container 1 became the COP resin layer, the two pieces of the multi-layer film were welded with each other along peripheral edges thereof by heat sealing to produce the fluid container 1 as illustrated in FIG. 1 and having 115 mm width and 170 mm length. The weld width was set at 5 mm along both side edges and at 3 mm at a narrowest position, and as heat-sealing conditions, a container main body 2 was welded at 260° C. for 4 seconds at both its welding part for the port 5 and its peripheral edges other than the welding part. A hole 11 was arranged as a hanging section at a position opposite to the outlet port 3, whereby the fluid container 1 as illustrated in FIG. 1 was produced.

[Formation of Outlet Port 3]

Formation of Port Portion 5:

40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a resin blend such that a COP resin layer would have 115° C. glass transition temperature. In the resin blend, a styrene-based thermoplastic elastomer was incorporated at 1.0 wt % as a rubber component. Using the resulting resin, the port portion 5 was molded by injection molding.

Formation of Plug Portion 4:

A resin covering 7 of a plug portion 4 as illustrated in FIG. 3 was molded in a similar manner as the port portion 5. The resin covering 7 was provided with a flange portion, which extended out in the form of a flange, and a cylindrical portion, which extended downwardly from a lower end of a peripheral edge of the flange portion to hold a rubber plug in place and to fit in the port portion. The flange portion and cylindrical portion were formed integrally with each other. A lower end part of the cylindrical portion was formed to define an acute angle on the side of an outer peripheral edge thereof, as viewed in a cross-section. The rubber plug 6 was made of isoprene rubber and, at a surface where the rubber plug 6 would come into contact with a content fluid, was provided with a protective layer 8 formed of a fluorinated resin and bonded to the surface. The rubber plug 6 was physically fitted in the molded resin covering 7 to provide the plug portion 4 as illustrated in FIG. 3.

Welding Between Port Portion 5 and Plug Portion 4:

After purified water (100 mL) was filled as the content fluid into the container main body 2 through the port portion 5, the plug portion 4 was fitted in the port portion 5. Using an ultrasonic sealing machine, welding was performed for 0.2 second while supporting the flange portion 10 of the port portion 5 on an anvil and maintaining an upper surface of the plug portion 4 in contact with a horn. As a result, the port portion 5 and plug portion 4 were completed as the outlet port 3 as illustrated in FIG. 2, and at the same time, the fluid container 1 was sealed. Upon welding, the portion of the resin covering 7, which was formed at an acute angle as viewed in cross-section, was caused to melt into a planar form, so that the resin covering 7 was welded fluid tight and firmly with the flange portion 10 of the port portion 5.

Example 2

[Production of Fluid Container 1]

60 wt % of a COP resin, which had 135° C. glass transition temperature and did not include in a backbone thereof molecular structures of the formula (1), and 40 wt % of another COP resin, which had 102° C. glass transition temperature and did not include in a backbone thereof molecular structures of the formula (1), were blended to prepare a sealant such that a COP resin layer would have 122° C. glass transition temperature. A linear low-density polyethylene of 935 kg/m$^3$ density, an intermediate-layer resin composed of a linear low-density polyethylene of 925 kg/m$^3$ density and another linear low-density polyethylene of 905 kg/m$^3$ density, and the sealant were formed into films by the T-die multi-layer co-extrusion method such that the films had 20 μm, 170 μm and 60 μm thickness, respectively, whereby a multi-layer film of 250 μm in total thickness was prepared.

With a port portion 5 of an outlet port 3, which had been formed as will be described below, being held between two pieces of the multi-layer film such that the innermost layer of a fluid container 1 became the COP resin layer, the two pieces of the multi-layer film were welded with each other along peripheral edges thereof to produce the fluid container 1 as illustrated in FIG. 1 and having 115 mm width and 170 mm length. The weld width, heat-sealing conditions and the formation of a hanging section were set and conducted as in Example 1.

[Formation of Outlet Port 3]
Formation of Port Portion 5:

60 wt % of a COP resin, which had 135° C. glass transition temperature and did not include in a backbone thereof molecular structures of the formula (1), and 40 wt % of another COP resin, which had 102° C. glass transition temperature and did not include in a backbone thereof molecular structures of the formula (1), were blended to prepare a resin blend such that a COP resin layer would have 122° C. glass transition temperature. In the resin blend, a hydrogenated styrene-based thermoplastic elastomer was dispersed and incorporated at 5.0 wt % as a rubber component. Using the resulting resin, a port portion 5 was molded by injection molding.

Formation of Plug Portion 4:

A resin covering 7 of a plug portion 4 as illustrated in FIG. 3 was molded in a similar manner as the port portion 5. A rubber plug 6, which was made of chlorinated butyl rubber and was not provided with the bonded protective layer 8, was physically fitted in the molded resin covering 7 to provide the plug portion 4 as illustrated in FIG. 3. Therefore, the plug portion 4 was not provided with the protective layer 8 for the rubber plug 6.

Welding Method Between Port Portion 5 and Plug Portion 4:

In a similar manner as in Example 1, the port portion 5 and plug portion 4 were completed as an outlet port 3 as illustrated in FIG. 2, and at the same time, the fluid container 1 was sealed. The outlet port 3 was, however, not provided with the protective layer 8 for the rubber plug 6.

Example 3

The procedure of Example 1 was followed except for the formation of an outlet port 3.

[Formation of Outlet Port 3]
Formation of Port Portion 5:

40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a COP resin blend such that a COP resin layer would have 115° C. glass transition temperature. In the COP resin blend, a linear low-density polyethylene of 922 kg/m$^3$ density was incorporated at 10 wt %. Using the resulting resin, a port portion 5 was molded by injection molding.

Formation of Plug Portion 4:

A resin covering 7 of a plug portion 4 as illustrated in FIG. 3 was molded in a similar manner as the port portion 5. A rubber plug 6 made of chlorinated butyl rubber was physically fitted in the molded resin covering 7 to provide the plug portion 4 as illustrated in FIG. 3.

Welding Method Between Port Portion 5 and Plug Portion 4:

In a similar manner as in Example 1, the port portion 5 and plug portion 4 were completed as the outlet port 3 as illustrated in FIG. 2, and at the same time, a fluid container 1 was sealed.

Example 4

The procedure of Example 2 was followed except for the formation of an outlet port 3.

[Formation of Outlet Port 3]
Formation of Port Portion 5:

A port portion 5 was molded in a similar manner as in Example 1 except that a styrene-based thermoplastic elastomer was dispersed and incorporated at 0.3 wt % as a rubber component.

Formation of Plug Portion 4:

A resin covering 7 of a plug portion 4 as illustrated in FIG. 3 was molded in a similar manner as the port portion 5. A rubber plug 6, which was made of chlorinated butyl rubber and was not provided with any protective layer, was physically fitted in the molded resin covering 7 to provide the plug portion 4 as illustrated in FIG. 3. However, the welding time was set at 0.3 second.

Welding Method Between Port Portion 5 and Plug Portion 4:

In a similar manner as in Example 2, the port portion 5 and plug portion 4 were completed as the outlet port 3 as illustrated in FIG. 2, and at the same time, a fluid container 1 was sealed.

Example 5

The procedure of Example 1 was followed except for the formation of an outlet port 3.

[Formation of Outlet Port 3]
Formation of Port Portion 5:

A port portion 5 was molded in a similar manner as in Example 1 except that a styrene-based thermoplastic elastomer was dispersed and incorporated at 0.15 wt % as a rubber component.

Formation of Plug Portion 4:

A resin covering 7 of a plug portion 4 as illustrated in FIG. 3 was molded in a similar manner as the port portion 5. A rubber plug made of chlorinated butyl rubber was physically fitted in the molded resin covering 7 to provide the plug portion 4 as illustrated in FIG. 3. As a rubber component in a COP resin layer, however, a styrene-based thermoplastic elastomer was dispersed and incorporated at 20 wt %.

Welding Method Between Port Portion 5 and Plug Portion 4:

In a similar manner as in Example 1, the port portion 5 and plug portion 4 were completed as the outlet port 3 as illustrated in FIG. 2, and at the same time, a fluid container 1 was sealed.

Example 6

The procedure of Example 2 was followed except for the formation of an outlet port 3.

[Formation of Outlet Port 3]
Formation of Port Portion 5:

A port portion 5 was molded in a similar manner as in Example 1 except that a styrene-based thermoplastic elastomer was dispersed and incorporated at 0.2 wt % as a rubber component.

Formation of Plug Portion 4:

A plug portion 4 was formed in a similar manner as in Example 1 except that 60 wt % of a COP resin, which had 135° C. glass transition temperature and did not include in a backbone thereof molecular structures of the formula (1), and 40 wt % of another COP resin, which had 102° C. glass transition temperature and did not include in a backbone thereof molecular structures of the formula (1), were blended to prepare a resin blend such that a COP resin layer would have 122° C. glass transition temperature and that a styrene-based thermoplastic elastomer was dispersed and incorporated at 35 wt % as a rubber component in the resin blend and the resulting COP resin was used.

Welding Method Between Port Portion 5 and Plug Portion 4:

In a similar manner as in Example 1, the port portion 5 and plug portion 4 were completed as the outlet port 3 as illustrated in FIG. 2, and at the same time, a fluid container 1 was sealed.

Example 7

The procedure of Example 1 was followed except for the formation of an outlet port 3.

[Formation of Outlet Port 3]
Formation of Port Portion 5:

A port portion 5 was molded in a similar manner as in Example 1 except that a styrene-based thermoplastic elastomer was dispersed and incorporated at 0.2 wt % as a rubber component.

Formation of Plug Portion 4:

A plug portion 4 was formed in a similar manner as in Example 3 except that 40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a COP resin blend such that a COP resin layer would have 115° C. glass transition temperature and that linear low-density polyethylene of 922 kg/m$^3$ density and a phenol-based antioxidant ("IRGANOX 1010") were incorporated at 0.3 wt %, respectively, in the COP resin blend.

Welding Method Between Port Portion 5 and Plug Portion 4:

In a similar manner as in Example 1, the port portion 5 and plug portion 4 were completed as the outlet port 3 as illustrated in FIG. 2, and at the same time, a fluid container 1 was sealed.

Example 8

The procedure of Example 1 was followed except for the formation of an outlet port 3.

[Formation of Outlet Port 3]
Formation of Port Portion 5:

A port portion 5 was molded in a similar manner as in Example 1 except that a styrene-based thermoplastic elastomer was dispersed and incorporated at 1.0 wt % as a rubber component.

Formation of Plug Portion 4:

A plug portion 4 was molded in a similar manner as in Example 1 except for the use of a COP resin blend prepared to have 117° C. glass transition temperature by blending 60 wt % of a COP resin, which had 125° C. glass transition temperature and did not include in a backbone thereof molecular structures of the formula (1), with 40 wt % of another COP resin, which had 105° C. glass transition temperature and did not include in a backbone thereof molecular structures of the formula (1).

Welding Method Between Port Portion 5 and Plug Portion 4:

Employed were the plug portion 4 and the port portion 5, which as illustrated in FIG. 4, were planer at a lower end thereof and planar at an upper end thereof, respectively. In the plug portion 4, a rubber plug 6 had been held in place by a resin covering 7 by insert molding. The rubber plug 6 was made of isoprene rubber, and had a protective layer 8 made of a fluorinated resin and bonded on the rubber plug 6. The plug portion 4 and the port portion 5 were arranged opposite each other such that the lower end of the plug portion 4 and the upper end of the port portion 5 lied parallel to each other. With a heating element of a nickel alloy made of International Nickel Company being arranged between the plug portion 4 and the port portion 5 such that the heating element was apart by a distance of 5 mm from the lower end of the plug portion 4 and the upper end of the port portion 5, respectively, an electrical current was applied for 10 seconds to the heating element to perform non-contact heating so that the molten lower end of the plug portion 4 was pressure-bonded to the molten upper end of the port portion 5 to complete an outlet port 3 and at the same time, to seal a fluid container 1.

Example 9

The procedure of Example 2 was followed except for the formation of an outlet port 3.
[Formation of Outlet Port 3]
Formation of Port Portion 5:

A port portion 5 was molded in a similar manner as in Example 2 except that a styrene-based thermoplastic elastomer was dispersed and incorporated at 0.4 wt % as a rubber component.

Formation of Rubber Plug Portion 4:

A plug portion 4 was formed in a similar manner as in Example 2 except that 40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a COP resin blend such that a COP resin layer would have 115° C. glass transition temperature and that a phenol-based antioxidant ("IRGANOX 1010") was incorporated at 0.5 wt % in the COP resin blend.

Welding Method Between Port Portion 5 and Plug Portion 4:

In a similar manner as in Example 2, the port portion 5 and plug portion 4 were completed as the outlet port 3 as illustrated in FIG. 2, and at the same time, a fluid container 1 was sealed.

Example 10

The procedure of Example 2 was followed except for the formation of an outlet port 3.
[Formation of Outlet Port 3]
Formation of Port Portion 5:

A port portion 5 was molded in a similar manner as in Example 2 except that a styrene-based thermoplastic elastomer was dispersed and incorporated at 0.15 wt % as a rubber component.

Formation of Rubber Plug Portion 4:

A plug portion 4 was formed in a similar manner as in Example 2 except that 40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a COP resin blend such that a COP resin layer would have 115° C. glass transition temperature and that linear low-density polyethylene of 922 kg/m³ density and a phenol-based antioxidant ("IRGANOX 1010") were incorporated at 30 wt % and 0.15 wt %, respectively, in the COP resin blend.

Welding Method Between Port Portion 5 and Plug Portion 4:

In a similar manner as in Example 2, the port portion 5 and plug portion 4 were completed as the outlet port 3 as illustrated in FIG. 2, and at the same time, a fluid container 1 was sealed.

Comparative Example 1

The procedure of Example 1 was followed except for the formation of an outlet port 3.

[Formation of Outlet Port 3]
Formation of Port Portion 5:

40 wt % of a COP resin, which had 130° C. glass transition temperature and included in a backbone thereof molecular structures of the formula (1), and 60 wt % of another COP resin, which had 105° C. glass transition temperature and included in a backbone thereof molecular structures of the formula (1), were blended to prepare a COP resin blend such that a COP resin layer would have 115° C. glass transition temperature. Using the COP resin blend which contained neither a rubber component nor an antioxidant, a port portion 5 was molded by injection molding.

Formation of Plug Portion 4:

A resin covering 7 of a plug portion 4 as illustrated in FIG. 3 was molded in a similar manner as the port portion 5. A rubber plug 6 made of isoprene rubber was physically fitted in the molded resin covering 7 to provide the plug portion 4 as illustrated in FIG. 3.

Welding Method Between Port Portion 5 and Plug Portion 4:

In a similar manner as in Example 1, the port portion 5 and plug portion 4 were completed as the outlet port 3 as illustrated in FIG. 2, and at the same time, a fluid container 1 was sealed.

Comparative Example 2

The procedure of Example 2 was followed except for the formation of an outlet port 3.
[Formation of Outlet Port 3]
Formation of Port Portion 5:

60 wt % of a COP resin, which had 135° C. glass transition temperature and did not include in a backbone thereof molecular structures of the formula (1), and 40 wt % of another COP resin, which had 102° C. glass transition temperature and did not include in a backbone thereof molecular structures of the formula (1), were blended to prepare a COP resin blend such that a COP resin layer would have 122° C. glass transition temperature. Using the COP resin blend which contained no polyethylene, a port portion 5 was molded by injection molding.

Formation of Plug Portion 4:

60 wt % of a COP resin, which had 135° C. glass transition temperature and did not include in a backbone thereof molecular structures of the formula (1), and 40 wt % of another COP resin, which had 102° C. glass transition temperature and did not include in a backbone thereof molecular structures of the formula (1), were blended to prepare a resin blend such that a COP resin layer would have 122° C. glass transition temperature. After a resin portion adapted to cover a rubber plug was molded with the COP resin blend which contained no polyethylene, a chlorinated butyl rubber plug 6 was fitted in the resin portion 7 to provide a plug portion 4.

Welding Method Between Port Portion 5 and Plug Portion 4:

After purified water (100 mL) was filled as a content fluid in a container main body 2 through the port portion 5, the plug portion 4 was fitted in the port portion 5. Using an ultrasonic sealing machine, welding was performed for 0.2 second to form the outlet port 3 so that a fluid container 1 was completed.

Evaluation of Examples and Comparative Examples
Dusting and Crazing by Welding

The welded areas between the port portions and plug portions in the outlet ports of Examples 1 to 10 and Comparative Examples 1 and 2 were visually observed. As a result, no adhesion of fine particles was confirmed in Examples 1 to 10. Smoky dusting was observed upon ultrasonic welding, but was of a similar degree as that observed when PE-based resin was used. In Comparative Examples 1 and 2, on the other hand, smoky dusting was also observed but the amounts of produced dust were 1.5 or more times those in Examples 1 to 10. In the outlet port of Comparative Example 1, the adhesion of numerous white fine particles was confirmed in the neighborhood of the welded area between the port portion and the plug portion. In the outlet port of Comparative Example 2, however, no adhesion of fine particles was confirmed.

The fine particles were removed from the outlet port of Comparative Example 1. The outlet ports of Examples 1 to 10 and Comparative Examples 1 and 2 were immersed in a red penetrant solution formed of an alcoholic solvent with a red dye contained therein, and were then visually evaluated. As a result, no penetration of the red penetrant solution was observed in the neighborhood of the welded area between the port portion and the plug portion in each of the outlet ports of Examples 1 to 10, and therefore, no welding-associated crazing was confirmed. In each of the outlet ports of Comparative Examples 1 and 2, on the other hand, the outlet port was locally colored in red by the red penetrant solution in the neighborhood of the welded area between the port portion and the plug portion, specifically on the side of the plug portion. As a consequence, it was found that crazes had occurred in a part of the plug portion.

Drop Impact Test:

After the fluid containers of Examples 1 to 10 and Comparative Examples 1 and 2 with purified water filled therein were subjected to retort sterilization treatment at 121° C. for 30 minutes, the fluid containers were stored for 24 hours in an air environment of 4° C. and were then individually caused to fall under gravity from the height of 1.5 m onto concrete to test them. The drop test of each fluid container was performed with the outlet port directed downwards such that the fluid container always dropped from the side of the outlet port onto the concrete, and the same fluid container was dropped 10 times. The respective outlet ports were immersed in the above-mentioned red penetrant solution, and were visually evaluated for the occurrence of cracks. As a result, the outlet ports of Example 1 to 10 were each free from the occurrence of cracks at both the port portion and the plug portion, and were each found to have sufficient strength. In the outlet ports of Comparative Examples 1 and 2, on the other hand, there was no fluid leak, but white cracks were confirmed in the plug portions.

INDUSTRIAL APPLICABILITY

According to the present invention, there can be provided an outlet port resistant to the occurrence of crazes, fine particles or dusting upon formation of the outlet port by welding a port portion, which is formed of a resin composed of a COP resin as a principal component, and a plug portion, which is formed of a resin composed of a COP resin as a principal component and serves to hold a rubber plug in place, with each other or resistant to the occurrence of a fracture from the plug portion of the outlet port upon dropping of a container, a method for forming the same, and a fluid container provided with the outlet port. This fluid container can prevent the adsorption or permeation of an active ingredient of a content fluid not only on or through a container main body but also on or through a resin that makes up the outlet port, and therefore, is useful for the field of fluid containers for medical applications which are to be filled specifically with intravenous drip preparations.

EXPLANATION OF REFERENCE NUMERALS

1 Fluid container
2 Container main body
3 Outlet port
4 Plug portion
5 Port portion
6 Rubber plug
7 Resin covering
8 Protective layer
9 Delivery channel
10 Flange portion
11 Hole

The invention claimed is:

1. An outlet port for a fluid container, said outlet port being capable of accommodating a rubber plug, through which a syringe needle can be inserted, such that the rubber plug is buried in an end of the outlet port, wherein the outlet port comprises:
a port portion and a plug portion, wherein
at least an innermost layer of the port portion is comprised of a resin composed of a cyclic polyolefin resin as a principal component, said innermost layer defining a delivery channel of the outlet port,
the plug portion is comprised of a resin composed of a cyclic polyolefin resin as a principal component and can serve to hold the rubber plug in place, and
the port portion and the plug portion are ultrasonically welded together at their respective resin layers composed of the cyclic polyolefin resins as the principal components, suppressing the occurrence of crazes, fine particles, or dusting, and
at least the resin that forms the plug portion includes a rubber component in a range of from 0.05 wt % to 30 wt %, or includes the cyclic polyolefin resin including in a backbone thereof molecular structures represented by the following formula (1) and includes a polyethylene-based resin in a range of from 1 wt % to 30 wt % and/or an antioxidant in a range of from 0.1 wt % to 1.0 wt %:

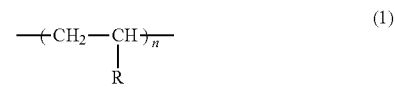

(1)

wherein C represents a carbon atom, H represents a hydrogen atom, R represents a hydrogen atom or an organic group having from 1 to 20 carbon atoms, and n stands for an integer of 2 or greater.

2. The outlet port according to claim 1, wherein the resin that forms the port portion includes a rubber component in a range of from 0.05 wt % to 20 wt %, or includes in a backbone thereof molecular structures represented by the formula (1) and includes a polyethylene-based resin in a range of from 1 wt % to 20 wt %.

3. The outlet port according to claim 1 or 2, wherein the rubber component is a thermoplastic elastomer.

4. The outlet port according to claim 1, wherein the port portion has, at a part thereof where the port portion is welded with the plug portion, a flange portion provided with a resin layer, which is composed of a cyclic polyolefin-based resin as a principal component, and extending out from the port portion.

5. The outlet port according to claim 2, wherein the port portion has, at a part thereof where the port portion is welded with the plug portion, a flange portion provided with a resin layer, which is composed of a cyclic polyolefin-based resin as a principal component, and extending out from the port portion.

6. The outlet port according to claim 3, wherein the port portion has, at a part thereof where the port portion is welded with the plug portion, a flange portion provided with a resin layer, which is composed of a cyclic polyolefin-based resin as a principal component, and extending out from the port portion.

7. An outlet port for a fluid container, said outlet port being capable of accommodating a rubber plug, through which a syringe needle can be inserted, such that the rubber plug is buried in an end of the outlet port; wherein a fluid in said container contacts only an interior surface of said container and a surface of said rubber plug, and wherein the outlet port comprises:
a port portion and a plug portion, wherein
at least an innermost layer of the port portion is comprised of a resin composed of a cyclic polyolefin resin as a principal component, said innermost layer defining a delivery channel of the outlet port,
the plug portion is comprised of a resin composed of a cyclic polyolefin resin as a principal component and serves to hold the rubber plug in place such that a surface of the rubber plug and a surface of said container completely contain the fluid in the container, and
the port portion and the plug portion are ultrasonically welded together at their resin layers composed of the cyclic polyolefin resins as the principal components, respectively, suppressing the occurrence of crazes, fine particles, or dusting, and
at least the resin that forms the plug portion includes a rubber component in a range of from 0.05 wt % to 30 wt %, or includes the cyclic polyolefin resin including in a backbone thereof molecular structures represented by the following formula (1) and includes a polyethylene-based resin in a range of from 1 wt % to 30 wt % and/or an antioxidant in a range of from 0.1 wt % to 1.0 wt %:

(1)

wherein C represents a carbon atom, H represents a hydrogen atom, R represents a hydrogen atom or an organic group having from 1 to 20 carbon atoms, and n stands for an integer of 2 or greater.

* * * * *